United States Patent [19]
Wevers

[11] Patent Number: 6,049,437
[45] Date of Patent: Apr. 11, 2000

[54] APPARATUS FOR PROVIDING NEW SERVO INFORMATION ON A DISK WITHOUT ENTIRELY ERASING OLD SERVO INFORMATION

[75] Inventor: William E. Wevers, San Jose, Calif.

[73] Assignee: Samsung Electronics Co., Ltd., Suwon, Rep. of Korea

[21] Appl. No.: 08/808,080

[22] Filed: Feb. 28, 1997

[51] Int. Cl.[7] .............................. G11B 5/09; G11B 5/012
[52] U.S. Cl. ........................... 360/48; 360/75; 360/77.08
[58] Field of Search .................................. 360/75, 77.08, 360/53, 77.07, 76.09, 58, 77.02, 48

[56] References Cited

U.S. PATENT DOCUMENTS

| | | | |
|---|---|---|---|
| 4,371,902 | 2/1983 | Baxter et al. | 360/77.08 |
| 5,333,140 | 7/1994 | Moraru et al. | 360/75 |
| 5,570,247 | 10/1996 | Brown et al. | 360/75 |
| 5,581,420 | 12/1996 | Chainer et al. | 360/75 |
| 5,606,469 | 2/1997 | Kosugi et al. | 360/77.08 |
| 5,615,058 | 3/1997 | Chainer et al. | 360/75 |
| 5,659,436 | 8/1997 | Yarmchuk et al. | 360/75 |
| 5,710,677 | 1/1998 | Teng et al. | 360/75 |
| 5,771,126 | 6/1998 | Choi | 360/77.08 |
| 5,771,130 | 6/1998 | Baker | 360/75 |
| 5,771,131 | 6/1998 | Pirzadeh | 360/77.08 |
| 5,796,543 | 8/1998 | Ton-That | 360/77.08 |
| 5,798,883 | 8/1998 | Kim | 360/75 |
| 5,867,337 | 7/1999 | Shimomura | 360/77.08 |
| 5,892,634 | 4/1999 | Ito et al. | 360/77.08 |

*Primary Examiner*—Nabil Hindi
*Attorney, Agent, or Firm*—Blakely, Sokoloff, Taylor & Zafman LLP; Jeffrey Aiello

[57] ABSTRACT

The present invention is a method and apparatus for rewriting servo information on a disk of a hard disk drive. The old servo data is erased after the new servo data has been written, using a stagger erase method. A disk pack having n sides is provided, where each of the n sides has a plurality of tracks, and each side is divided into a plurality of sectors. A first set of servo information is written on an nth sector of a track on an nth side of said disk pack. This step is repeated for n=1 through n, for every sector of the track for each side of the disk pack. Next, data is erased from one of every n sectors of the track on each side of said disk pack. The entire process is repeated for a predetermined number of tracks on each side of the disk pack. In an alternate embodiment, the data is erased from a first track while the read/write heads of the hard disk drive are being moved from the first track to a second track.

10 Claims, 16 Drawing Sheets

APPARATUS FOR PROVIDING NEW SERVO INFORMATION ON A DISK WITHOUT ENTIRELY ERASING OLD SERVO INFORMATION

BACKGROUND OF THE INVENTION

1. Field of the Invention

The present invention relates in general to disk storage systems and more particularly, to a method and apparatus for concurrently erasing and rewriting servo information on a disk in a hard drive assembly.

2. Description of the Related Art

Disk drives are magnetic recording devices used for the storage of information. The information is typically recorded on concentric tracks on either surface of one or more magnetic recording disks. To facilitate the storage and retrieval of data in an orderly manner, disks are typically organized in blocks called sectors. These sectors are located on the disk by a set of unique specifiers called cylinder (or track), head (or side) and sector number. The disks are rotatably mounted to a spin motor and information is accessed by means of read/write heads that are mounted to actuator arms which are rotated by a voice coil motor. The voice coil motor is excited with a current to rotate the actuator and move the heads.

The movement of the actuator is controlled by a servo system, utilizing servo information recorded on one or more of the magnetic recording disks. By reading this servo information, the actual radial positions of the heads can be determined, and after comparison with the desired head radial positions, control signals can be sent to move the actuator accordingly. Servo information is typically stored on a disk in one of two ways. In the first, a dedicated servo system, a set of several tracks on the disk or the entire disk surface, is reserved exclusively for storing information associated with the characteristic of the particular drive. Such information includes servo parameters and read/write channel parameters. A servo head reads this information to provide a continuous signal indicating the position of the servo head with respect to the disk surface. In the second type of servo system, the embedded servo system, sectors of servo information are interspersed with sectors of data on each disk surface. As a read head follows the data track around, it regularly reads a fresh sample of servo information from each servo sector with which to control its position.

Due to power consumption, cost and throughput concerns, a particular type of embedded servo system, known as the "stagger wedge" servo system is used in the disk drive industry. In the stagger wedge servo system, the servo information written on each head or side of a disk are not aligned. Instead, they are staggered. As shown in FIG. 1, the servo information stored on a track of one disk head is phase shifted from the servo information stored on the same track of another disk head.

For example, before writing the servo pattern to the disk surface, the array of read/write heads must be accurately positioned over the disk, by the master arm servo controller. When the master arm servo controller has attained the desired accuracy, head 0 is first activated and directed to write sector 1, head (or side) 0, track 1, of the disk pack in a hard drive assembly. Upon completion of the sector 1, head 0, servo writing process, head 0 is deactivated. R/W head 1 is then activated and directed to write the servo pattern in sector 1, head (or side) 1, track 1 of the disk pack. Upon completion of the servo writing process, R/W head 1 is deactivated. The same process is continued for R/W head 2 and R/W head 3 in sector 1, head (or side) 2, track 1 and sector 1, head (or side) 3, track 1 of the disk pack respectively. Thus, the servo pattern for all four R/W heads of the disk pack are written during a particular sector cycle.

By activating one R/W head at a time, the stagger wedge servo writing scheme may be used to efficiently complete servo writing an entire cylinder with minimum power consumption. However, this servo writing scheme presents a significant problem when used to rewrite servo information on a disk pack in a hard drive assembly. In particular, since only one R/W head (for example R/W head 1) is turned on at a particular time, the remaining heads (for example, R/W heads 2–4) are inactive. As a result, the data fields in sector 1, heads 2–4 of the disk pack will not have any data recorded on them. When a new servo pattern is written over the disk pack, two servo patterns, the old and the new patterns, will co-exist on the disk pack, as shown in FIG. 2, resulting in confusion during an attempt to read the reworked disk.

One approach in solving this problem is to erase the entire disk pack prior to rewriting servo patterns on the disk pack. However, this significantly reduces throughput and thus, the manufacturing productivity of hard disk drives.

Accordingly, there is a need in the technology for a method and apparatus for rewriting servo information on a disk pack in a hard drive assembly without first having to erase the entire disk pack.

BRIEF SUMMARY OF THE INVENTION

The present invention is a method and apparatus for rewriting servo information on a disk of a hard disk drive. The old servo data is erased after the new servo data has been written, using a stagger erase method. A disk pack having n sides is provided, where each of the n sides has a plurality of tracks, and each side is divided into a plurality of sectors. A first set of servo information is written on an nth sector of a track on an nth side of said disk pack. This step is repeated for n=1 through n, for every sector of the track for each side of the disk pack. Next, data is erased from one of every n sectors of the track on each side of said disk pack. The entire process is repeated for a predetermined number of tracks on each side of the disk pack. In an alternate embodiment, the data is erased from a first track while the read/write heads of the hard disk drive are being moved from the first track to a second track.

DETAILED DESCRIPTION OF THE INVENTION

The present invention is a method and apparatus for rewriting servo information on a disk of a hard disk drive. The old servo data is erased after the new servo data has been written, using a stagger erase method. The stagger erase procedure saves time because only a fraction of the old servo data is erased. As an example, the minimum number of sectors to be erased=(sectors/revolution)/Q, where Q is the number of consecutive servo samples for the hard disk drive's servo system to acquire servo lock. If Q=6 and there are 72 servo wedges or servo fields per track, 12 out of 72 wedges must be erased, so that every 6th old servo wedge (wedges 0, 6, 12, 18, . . .) is erased. In this manner, the present invention prevents acquisition of the old servo data by the hard disk drive's servo electronics. After the stagger erase procedure, a stagger write operation is performed. Then the master arm position is incremented to the next servo track. This process is repeated for a predetermined number of tracks.

In an alternate embodiment, the old servo data is erased during the stagger erase procedure, concurrently with the master arm movement. This saves time, since the array of R/W heads are normally deactivated, while the master arm servo controller is performing a move operation. The amount of time saved is considerable, since the master arm movement time can be a large percentage of the total servo write time.

Figure 1:
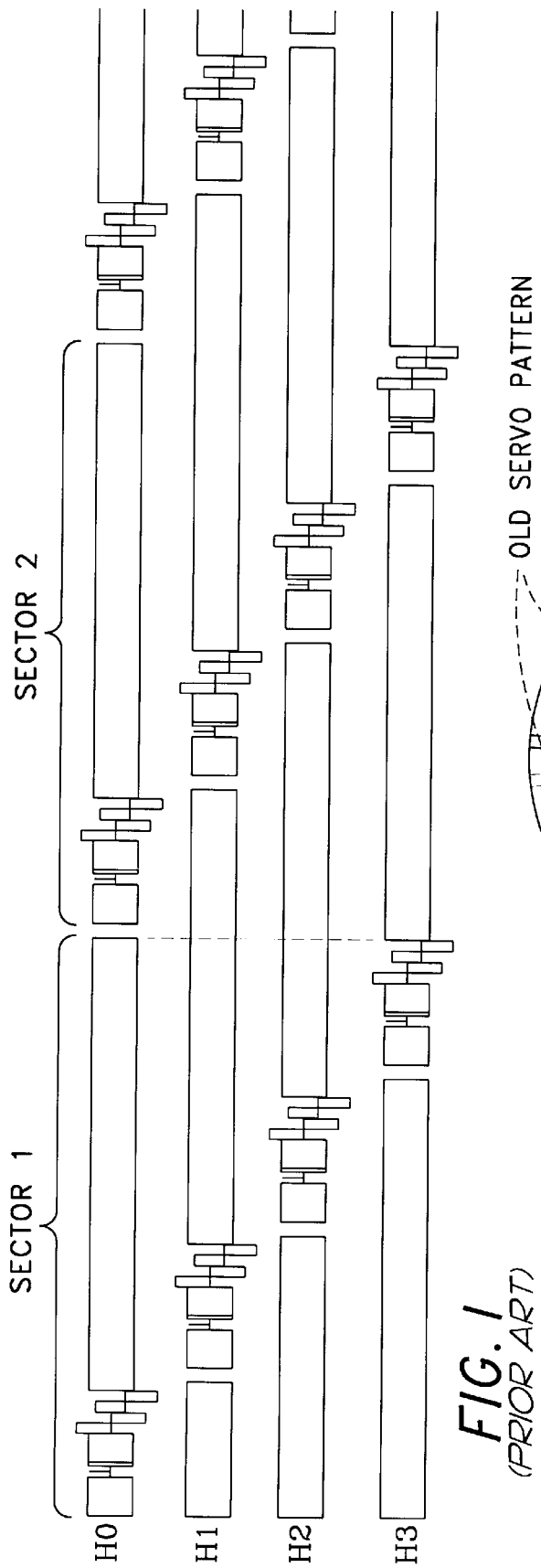
FIG. 1 illustrates the servo patterns on a disk pack of a hard drive assembly written using the stagger wedge servo writing system of the prior art.
Figure 2:
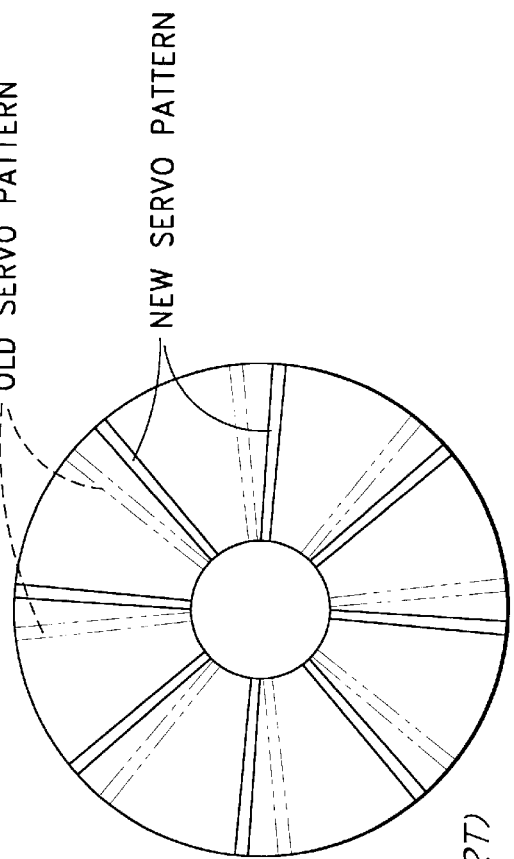
FIG. 2 illustrates the coexistence of old and new servo patterns on a disk pack using the stagger wedge servo writing system of the prior art.
Figure 3A:
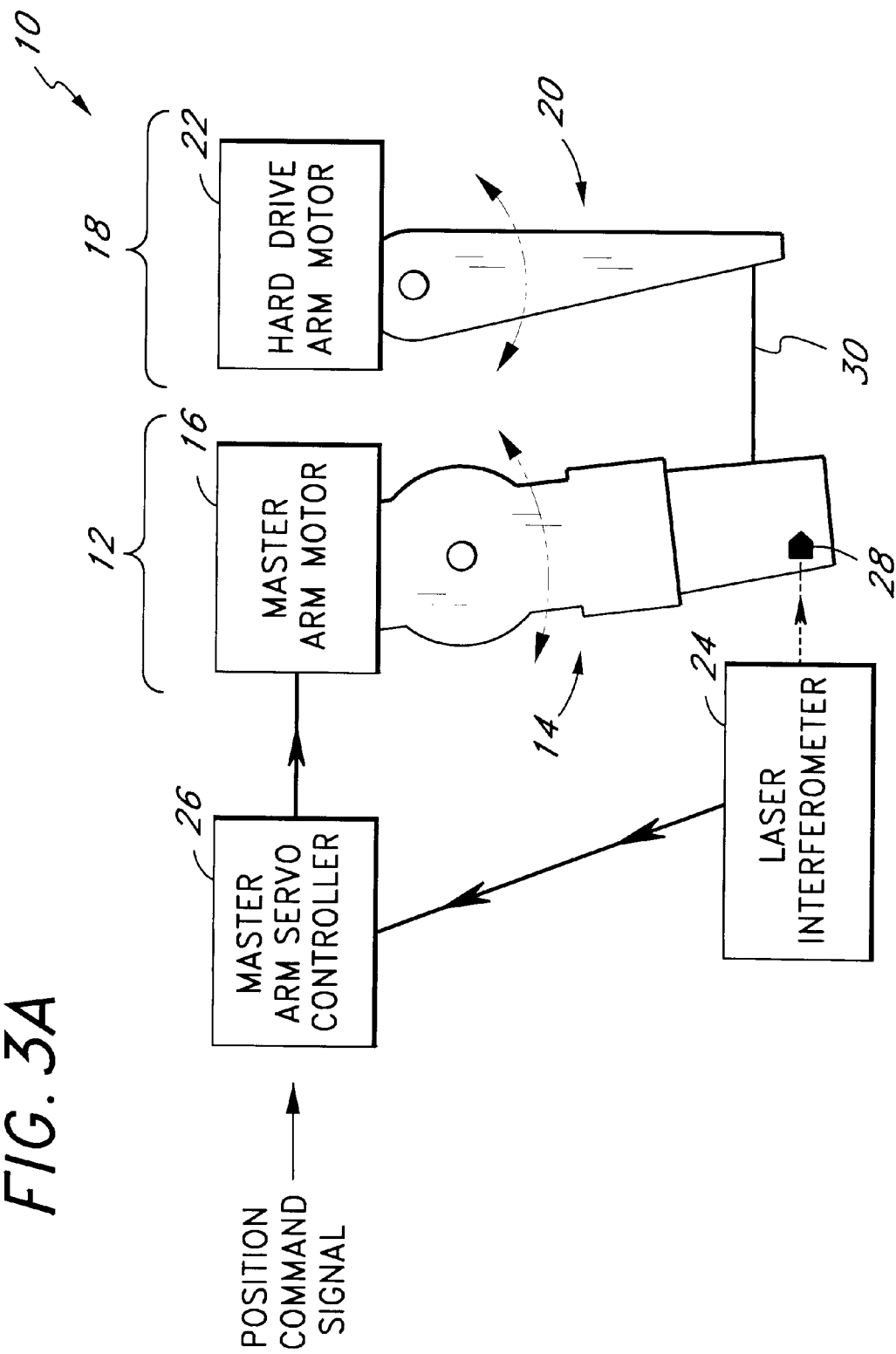
FIG. 3A illustrates a servo writing system which implements the method of the present invention.

Referring to the drawings more particularly by reference numbers, FIG. 3A illustrates a servo writing system 10 which implements the re-servo writing process of the present invention. The servo writing system 10 directs the re-servo writing process by positioning the read/write heads in a magnetic disk drive from a master arm and motor. The servo writing system 10 includes a master drive assembly 12 which includes a master arm 14 that has a master voice coil motor 16. The servo writing system 10 also comprises a hard drive assembly 18 which includes a hard drive arm 20 that has a hard drive voice coil motor 22.

To ensure that the master arm 14 is accurately positioned, a laser interferometer 24 is used to measure the position of the master arm 14. This information is relayed to a master arm servo controller 26, which moves the master arm 14 to the desired track of the data storage disk in which data is to be recorded. The laser interferometer 24 detects the position of the master arm 14 by monitoring light reflected off a reflector 28 mounted on the master arm 14. This information is relayed to the master arm servo controller 26, which also receives a position command signal from an external source, such as a computer, which is programmed to coordinate servo writing.

Figure 3B:
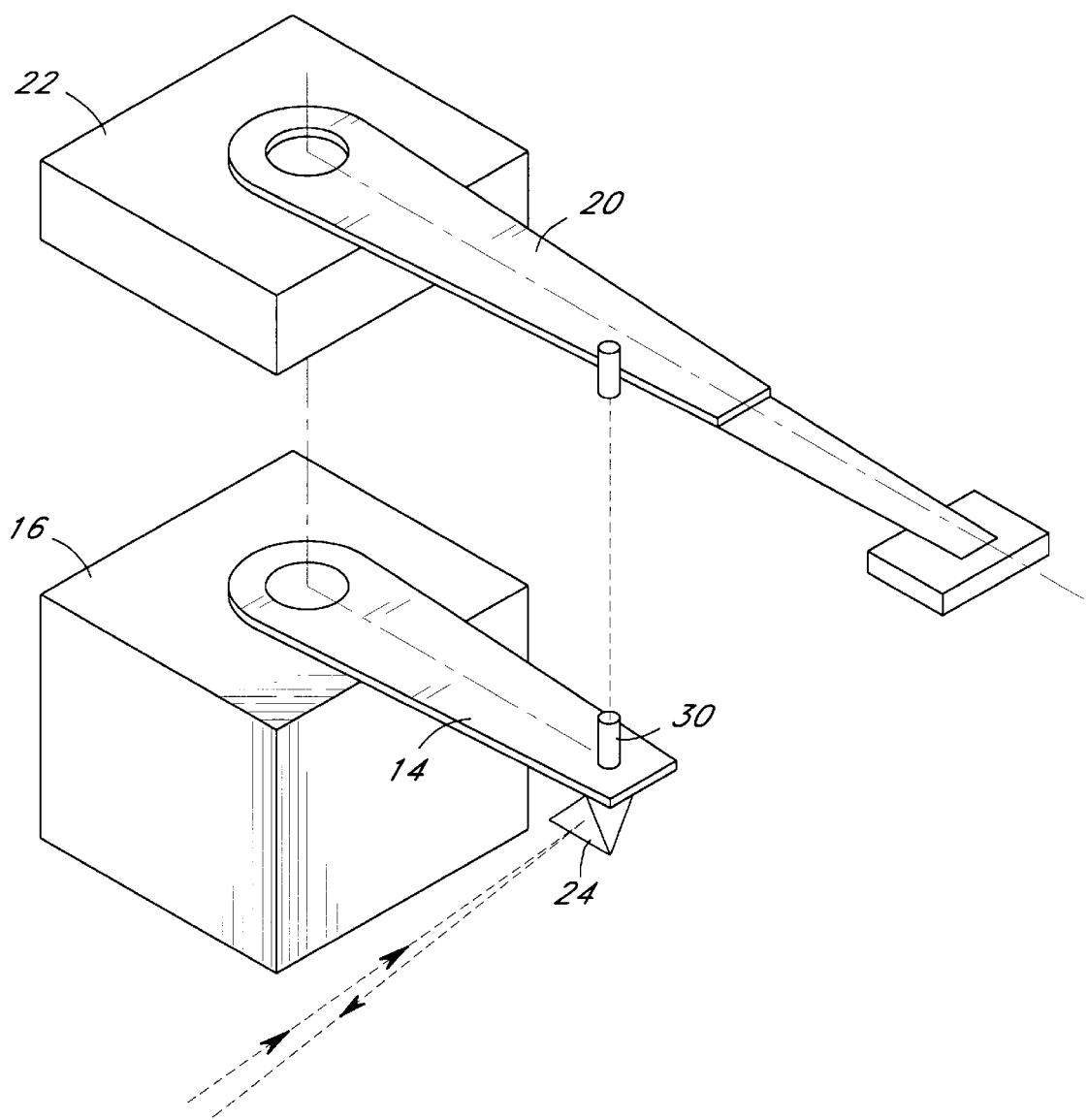
FIG. 3B is a perspective view of a portion of the servo-writing system of FIG. 3A.

A mechanical link between the master arm 14 and the hard drive arm 18 is established with the use of a mechanical push-pin 30, as shown in FIGS. 3A and 3B. The mechanical push-pin 30 is attached at one end to the master arm 14 and extends into the hard drive through an access slot. The hard drive arm 20 is biased by its motor to press against the side of the push pin and follow the master arm 14. This mechanical positioning system enables the hard drive arm 20 to track movement of the master arm 14, and thus assure writing of servo information at the proper radius of the hard drive assembly 18.

Figure 4:
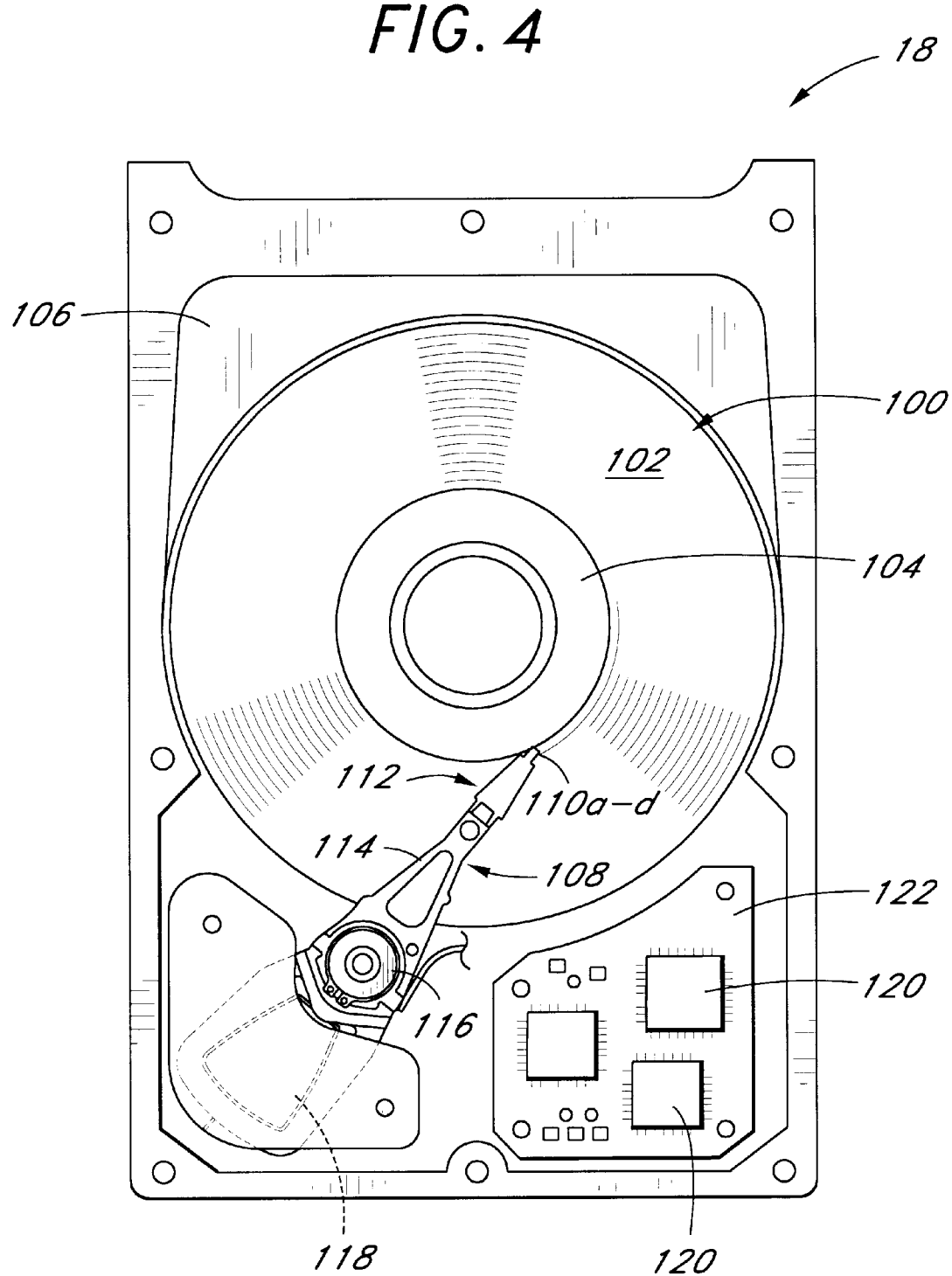
FIG. 4 illustrates a hard disk drive which utilizes one aspect of the method of the present invention.

FIG. 4 shows the hard disk drive 18 of FIG. 3A. The disk drive 18 includes a disk pack 100 with a plurality of disks 102 that are collectively rotated by a spin motor 104. The spin motor 104 corresponds to the hard drive arm motor 22 in FIG. 3A. The spin motor 104 is mounted to a base plate 106. Also mounted to the base plate 106 is an actuator arm assembly 108. The actuator arm assembly 108 corresponds to the hard drive arm 20 in FIG. 3A. The actuator arm assembly 108 includes a number of read/write (R/W) heads 110a–d mounted to corresponding flexure arms 112. The flexure arms 112 are attached to an actuator arm 114 that can rotate about a bearing assembly 116. The assembly 108 also contains a voice coil motor 118 which moves the heads 110a–d collectively relative to the disks 102. There is typically a single head 110a, 110b, 110c, or 110d for disk head side H0, H1, H2 or H3 (not shown), respectively, of the disk pack 100. The spin motor 104, voice coil motor 118 and the R/W heads 110a–d are coupled to a number of electronic circuits 120 mounted to a printed circuit board 122. The electronic circuits 120 typically include a read channel chip, a microprocessor-based controller and a random access memory (RAM) device.

Figure 5A:
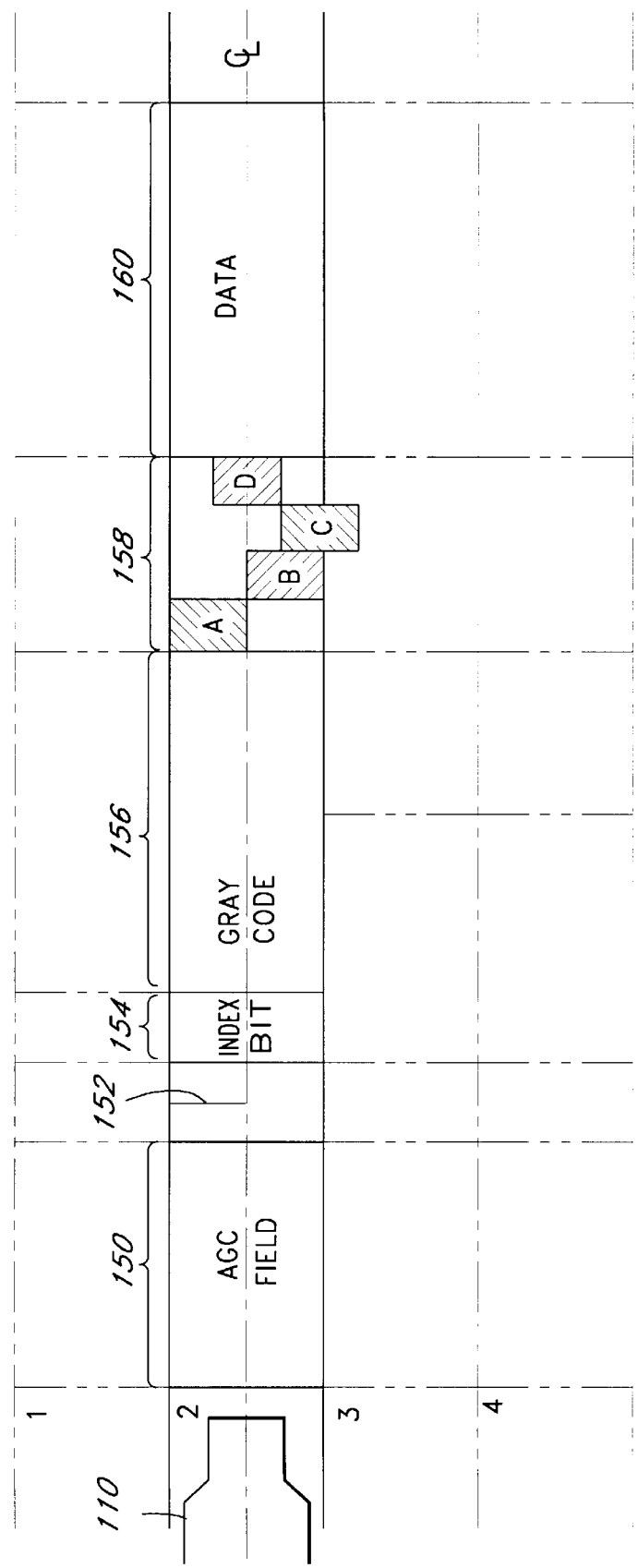
FIG. 5A illustrates sector 1, head 0 of a disk pack.

As shown in FIG. 5A, data is typically stored within sectors of radially concentric tracks located across any one of the disk heads H0–H3 of the disk pack 100. A typical sector will have a preamble field 150 which includes automatic gain control (AGC) information and synchronization information, an address mark 152 which signifies the beginning of a sector, an index field 154 which indicates the beginning of the first sector of the track, a gray code field 156 that identifies the particular cylinder (tracks) of the sector, a servo field 158 which includes a number of servo bits A, B, C, D, and a data field 160 which contains the data. The electronic circuits 120 utilize the servo bits A, B, C and D to maintain the heads 110a–d on the centerline CL of a corresponding track. The heads 110a–d can magnetize and sense the magnetic field of the disk heads H0–H3.

Figure 5B:
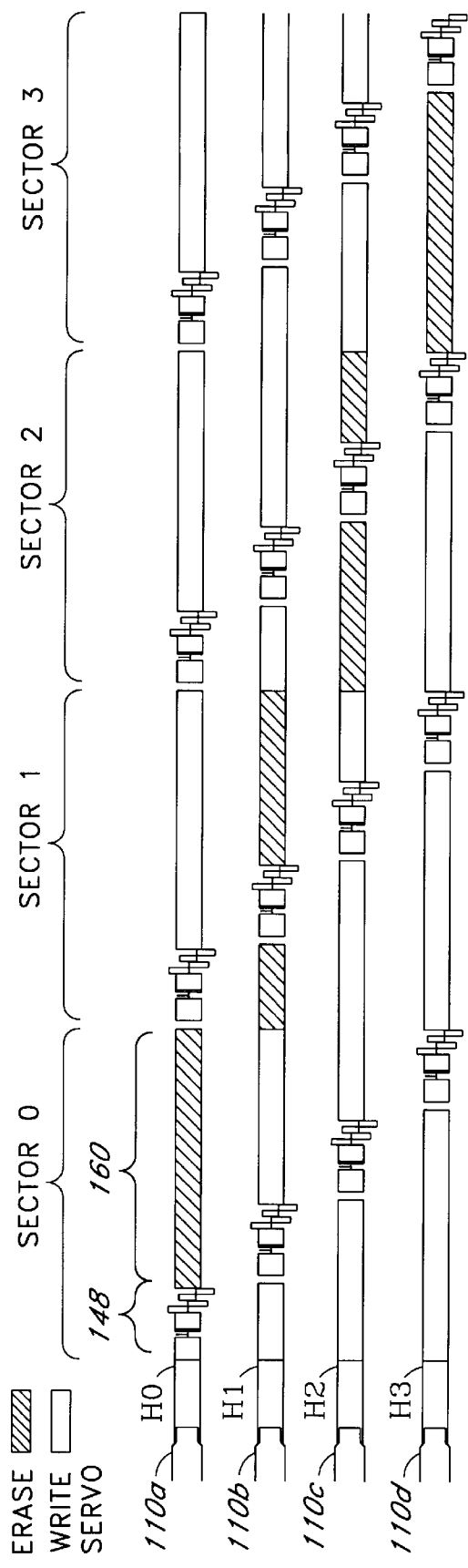
FIG. 5B illustrates a data sector of a disk in a disk pack having four heads, with servo information written using the stagger wedge servo writing scheme.

FIG. 5B illustrates a sector of a disk 102 in the disk pack 100 having four disk heads H0, H1, H2 and H3 with servo information written using the stagger wedge servo writing scheme. Each disk head H0, H1, H2 and H3 has a servo field 148 and a data field 160 as described above. In writing the servo patterns on such a four-head disk pack 100, each read/write (R/W) head 110a, 110b, 110c or 110d is individually activated and directed to write a particular servo pattern in a particular sector, such as sector 1, and head (or side) H0, H1, H2 or H3 of the disk pack 100. Upon completion of the servo writing process, the particular R/W head 110a, 110b, 110c or 110d is deactivated. Thus, the servo pattern for all four heads H0–H3 of the disk pack 100 are written during a particular sector cycle.

In particular, R/W head 110a is first directed to erase 1 sector of old data, located between adjacent wedges or servo fields 148, on head (or side) H0 of the disk pack 100. After erasing the sector of old data on head H0, R/W head 110b is directed to erase 1 sector of old data from head H1 of the disk pack 100. After this, R/W head 110c is directed to erase 1 sector of old data, from head H2 of the disk pack 100. After erasing the sector of old data from head H2, R/W head 110d is directed to erase 1 sector of old data from head H3 of the disk pack 100. At the end of erasing head H3, R/W head 110a is directed to erase 1 sector of old data from head (or side) 0 of the disk pack 100. This process is continued until 1 revolution of the disk pack 100 has been completed. In this manner, a disk drive with "N" wedges of old servo data, and "M" R/W heads 110, will have N/M sectors of old servo data erased from each servo track. The new servo data is written with a stagger write procedure, where more than 1 track of new servo data is written per revolution. After the write procedure, 1 revolution of the stagger erase is performed.

Figure 6:
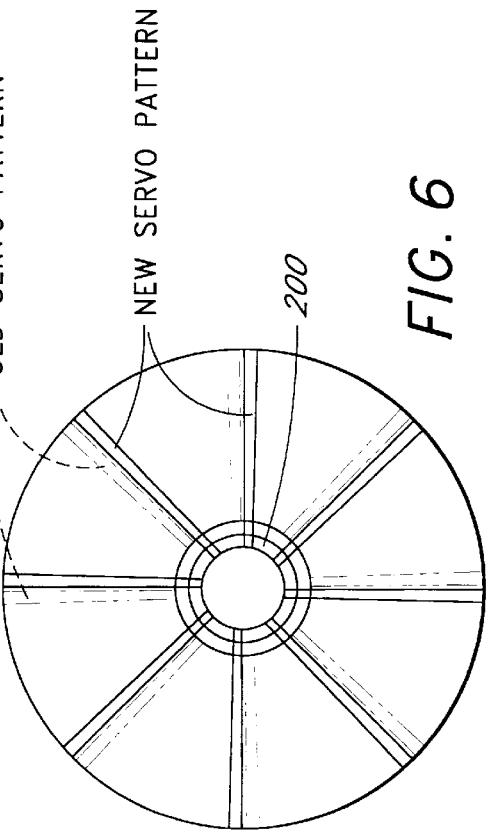
FIG. 6 is a top view of a disk pack that is re-servo written in accordance with the teachings of the present invention.

FIG. 6 is a top view of a disk pack 100 that is re-servo written in accordance with the teachings of the present invention. In writing the patterns of a rework disk, the re-servo writing procedure of the present invention first directs the master arm 14 to position the disk drive arm 20 mechanically at the outermost track. After arriving at the outermost track on the disk pack 100, a staggered erase is performed. This erases 1 out of 5 sectors on a 4 head disk drive. It then directs the R/W heads 110a–d to write the servo patterns in accordance with the stagger wedge scheme as described above. Upon completion of the servo writing process, the master arm 14 is directed to position the disk drive arm 20, to increment or move to the next track where new servo pattern is to be written. During the repositioning time, the R/W heads 110a–d are directed to erase old servo data, according to the stagger erase scheme described above, before the master arm 14 has finished moving to the required track. This is possible because precise positioning is not required for erasing the disks in the disk pack 100. In addition, it is also possible, because the width of the R/W heads 110a–d are larger than the tracks, typically in the order of twice the width of the tracks. The advantage of this technique is that it saves time while erasing. When the staggered erase is completed, the master arm 14 position is then checked to ensure that it has arrived over the next track within a prescribed tolerance. Then, the R/W heads 110a–d are directed to write servo patterns in accordance with the stagger wedge scheme as described above. This process is continued until the heads 110a–d reach the last servo track, for example, at track 6000 or when they reach the inner diameter crash stop.

During the power-up sequence, the actuator arm assembly 108 is biased against the inner diameter crash stop. The R/W heads 110a–d are then directed to locate the beginning of the new servo pattern, and to synchronize reading of the new servo pattern. Upon completion of this process, the calibration process is initiated.

By way of example, if the servo system requires data from six consecutive servo sectors to lock, and if the servo data from every sixth sector is erased, the servo system will not be able to lock onto the old servo pattern. This technique may be implemented in the above described erasing/rewriting technique in providing a new servo pattern on reworked disks.

Figure 7:
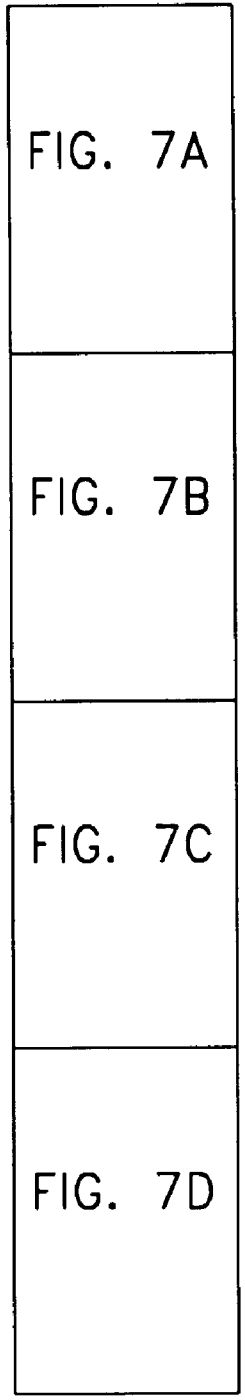
FIG. 7, which includes
Figure 7A:
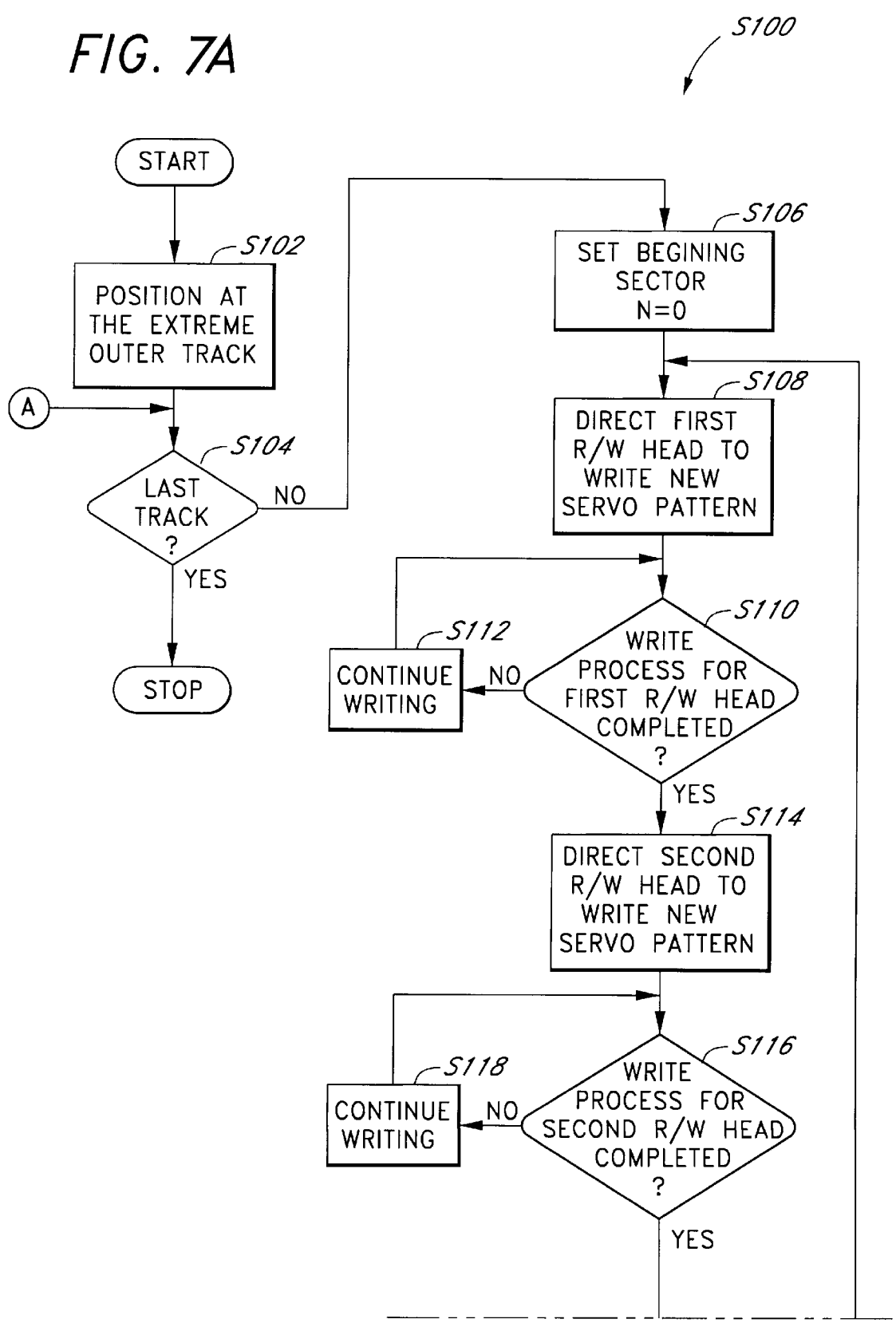
FIGS. 7A, 7B, 7C and 7D, are flowcharts illustrating the process of rewriting servo information in accordance with the teachings of the present invention.
Figure 7B:
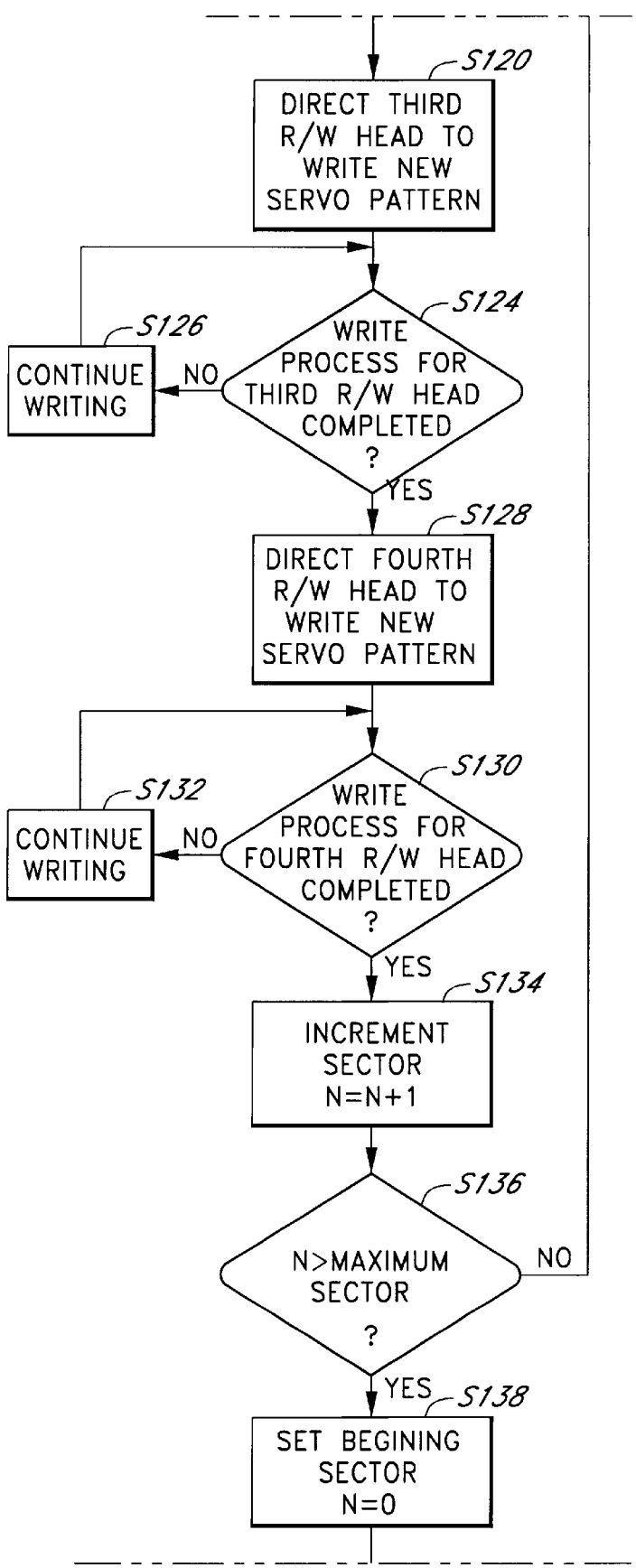
Figure 7C:
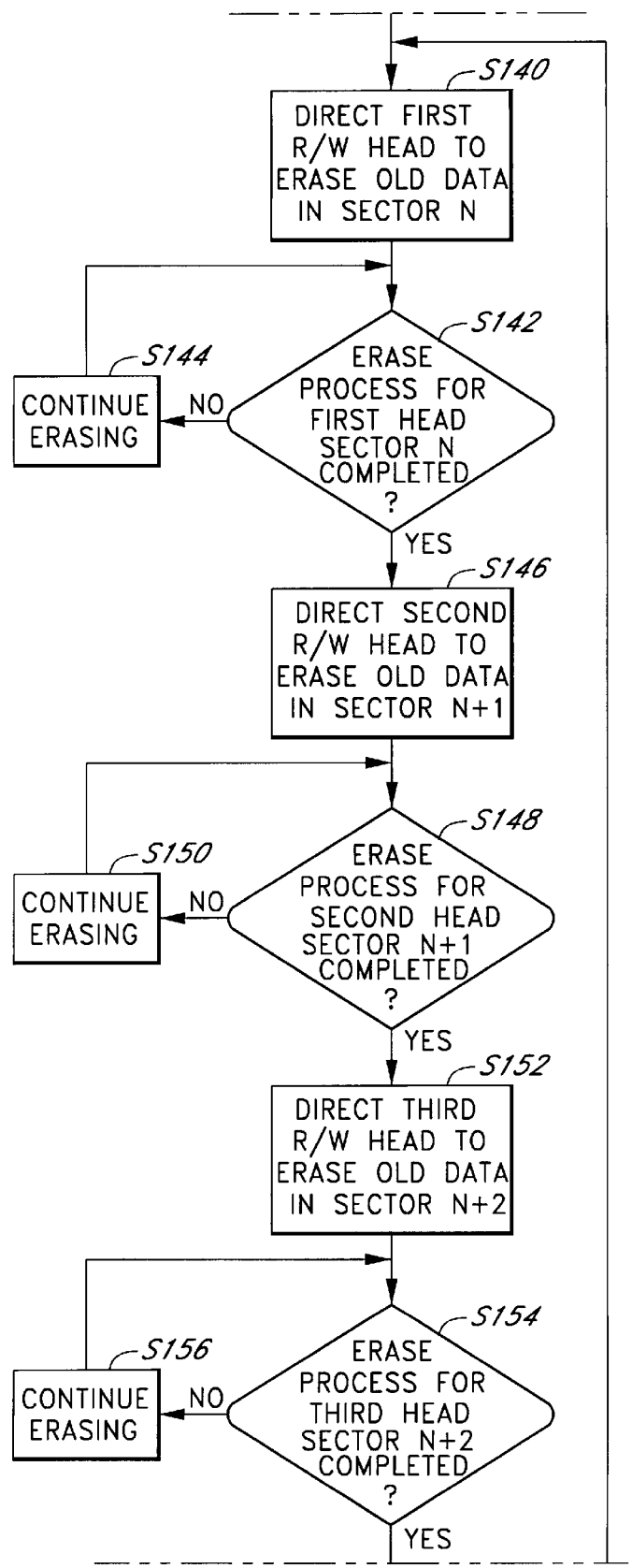
Figure 7D:
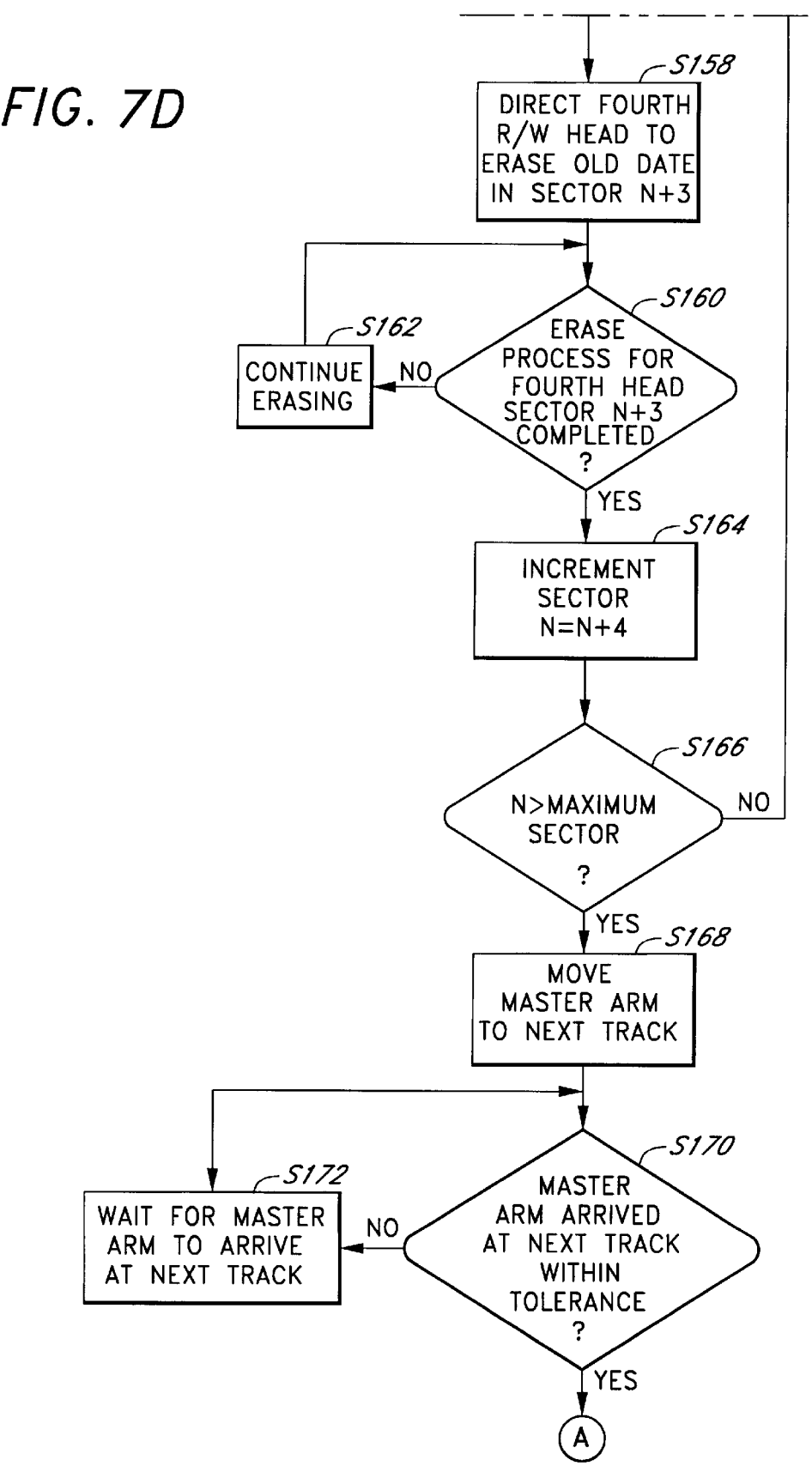

FIG. 7, which includes FIGS. 7A, 7B, 7C and 7D, are flowcharts that illustrate the process of rewriting servo information in accordance with the teachings of the present invention. In this embodiment, the stagger write process for an entire track is first performed, followed by the stagger erase process for the same track. Beginning from a start state, the process S100 of the present invention proceeds to process step S102 where it directs the master drive arm 14 (FIG. 3A) to position the disk drive arm 20 to the extreme outer track of the disks 102 in the disk pack 100. The process S100 then advances to process step S104, where it determines if it has reached the last track on the disks 102 in the disk pack 100. If so, the process S100 terminates. If not, the process S100 proceeds to process step S106, where it sets a counter for the beginning sector to N=0.

The process S100 then proceeds to process step S108, where the first R/W head 110a is directed to write the new servo pattern in the first sector on head H0. The process S100 then proceeds to decision step S110, where it determines if the write process for the first sector has been completed. If not, the process S100 proceeds to process step S112, where it continues with the write process. If the write process has been completed, the process S100 proceeds to process step S114, where it directs the second R/W head 110b to write the new servo pattern in the first sector of head H1. The process S100 then proceeds to decision step S116, where it determines if the write process for the first sector of head H1 has been completed. If not, the process S100 proceeds to process step S118, where it continues with the writing process. If the write process has been completed, the process S100 proceeds to process step S120, where it directs the third R/W head 110c to write the new servo pattern in the first sector of head H2. The process S100 then proceeds to decision step S124, where it determines if the write process has been completed. If not, the process S100 proceeds to process step S126, where it continues with the write process. If the write process has been completed, the process S100 proceeds to process step S128, where the fourth R/W head 110d is directed to write the new servo pattern on sector 1, head H3. The process S100 then proceeds to decision step S130, where it determines if the write process for the fourth R/W head 110d has been completed. If not the process S100 proceeds to process step S132. If the write process has been completed, the process S100 proceeds to process step S134.

At process step S134, the process S100 increments the sector count number by one, so that N=N+1. The process S100 then advances to decision step S136, where it queries if N is greater than the maximum number of sectors on the track. If not, the process S100 returns to process step S106. If N is indeed greater than the maximum number of sectors on the track, the process S100 proceeds to process step S138, where it sets a counter for the beginning sector to N=0.

The process S100 then process to process step S140, where the first R/W head 110a is directed to erase the old data from the current sector (sector N) on head H0. The process S100 then proceeds to decision step S142, where it determines if the erase process for the current sector has been completed. If not, the process S100 proceeds to process step S144, where it continues with the erase process. If the erase process has been completed, the process S100 proceeds to process step S146, where it directs the second R/W head 110b to erase old data from sector N+1 of head H1. The process S100 then proceeds to decision step S148, where it determines if the erase process for sector N+1 of head H1 has been completed. If not, the process S100 proceeds to process step S150, where it continues with the erase process. If the erase process has been completed, the process S100 proceeds to process step S152, where it directs the third R/W head 110c to erase old data from sector N+2 of head H2. The process S100 then proceeds to decision step S154, where it determines if the erase process has been completed. If not, the process S100 proceeds to process step S156, where it continues with the erase process. If the erase process has been completed, the process S100 proceeds to process step S158, where the fourth R/W head 110d is directed to erase old data from sector N+3 of head H3. The process S100 then proceeds to decision step S160, where it determines if the erase process for the fourth R/W head 110d has been completed. If not the process S100 proceeds to process step S162. If the erase process has been completed, the process S100 proceeds to process step S164.

At process step S164, the process S100 increments the sector count number by four, so that N=N+4. The process S100 then proceeds to decision step S166, where it queries if N is greater than the maximum number of sectors on the track. If not, the process S100 returns to process step S140. If N is indeed greater than the maximum number of sectors on the track, the process proceeds to process step S168, where it directs the master arm 14 to move to the next track. The process S100 then determines if the master arm 14 has arrived at the next track within specified tolerances (decision step S170). If not, the process S100 proceeds to process step S172, where it waits for the master arm 14 to arrive at the next track, and then returns to decision step S170. If the master arm 14 has arrived at the next track within specified tolerances, the process S100 proceeds to decision step S104, which determines if the process S100 has reached the last track on the disk pack 100. If so, the process S100 terminates.

Figure 8:
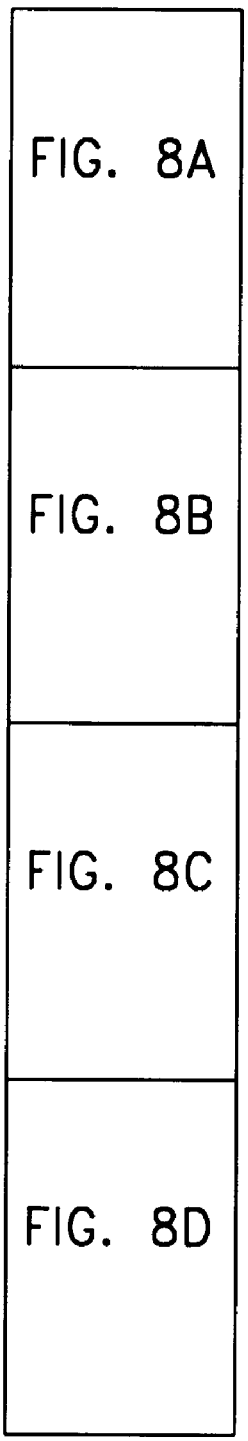
FIG. 8, which includes
Figure 8A:
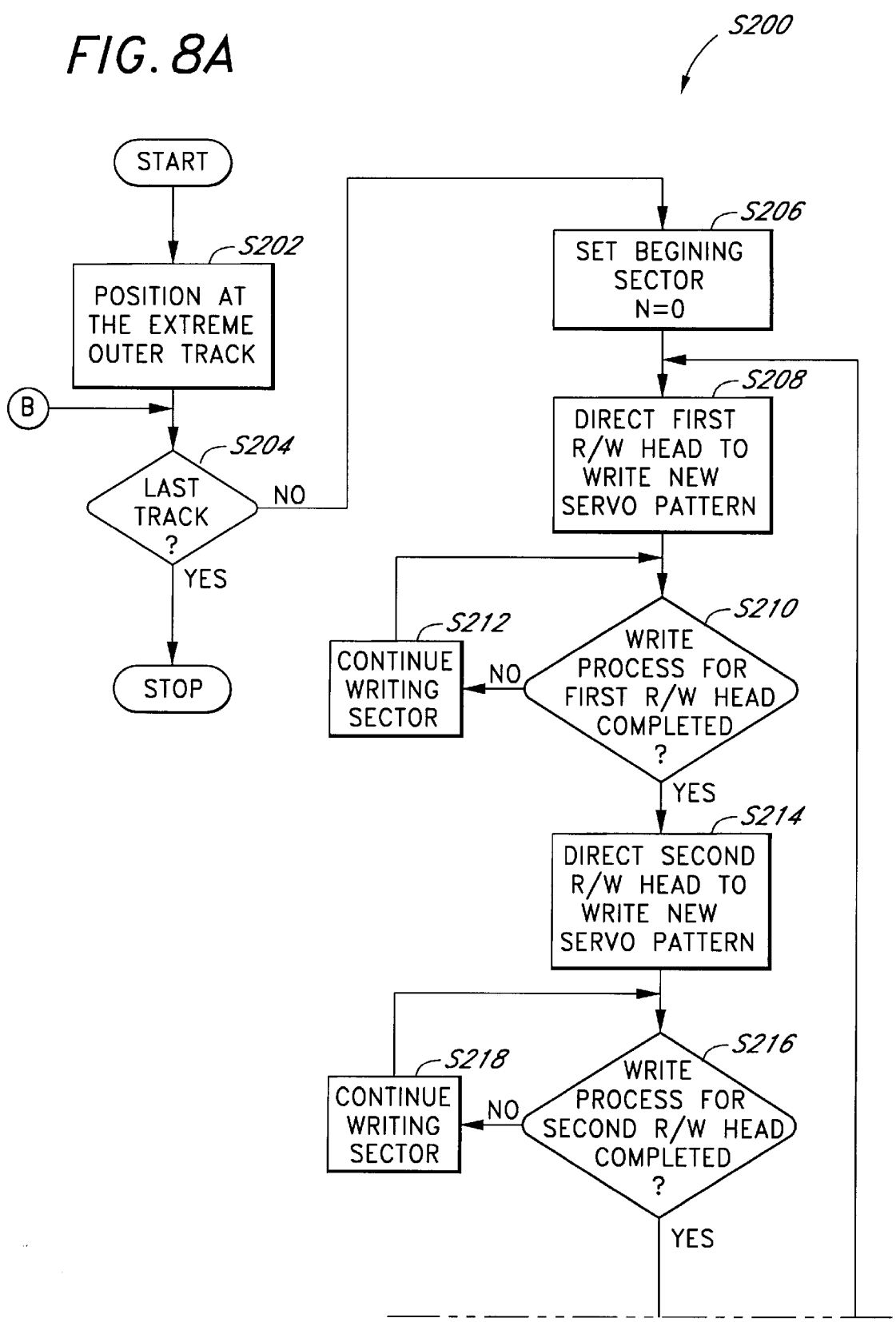
FIGS. 8A, 8B, 8C and 8D, are flowcharts illustrating an alternate embodiment of the process of rewriting servo information in accordance with the teachings of the present invention.
Figure 8B:
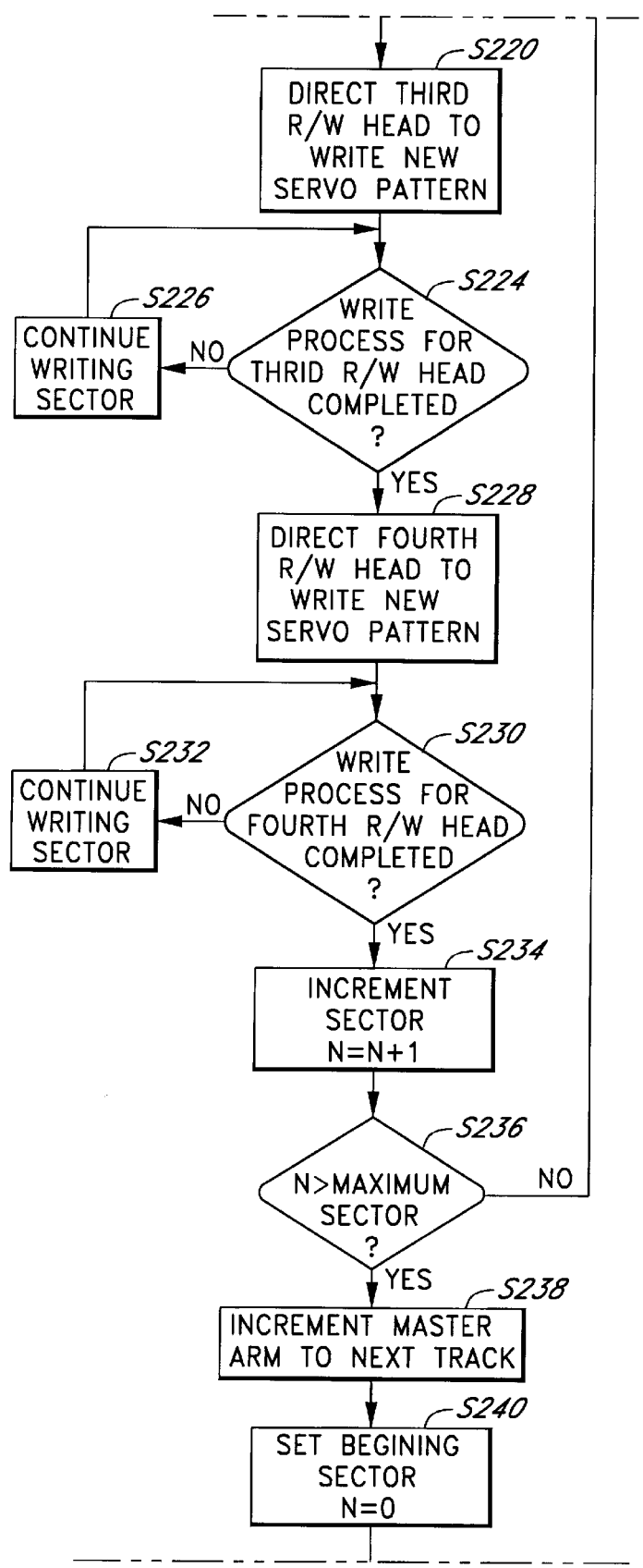
Figure 8C:
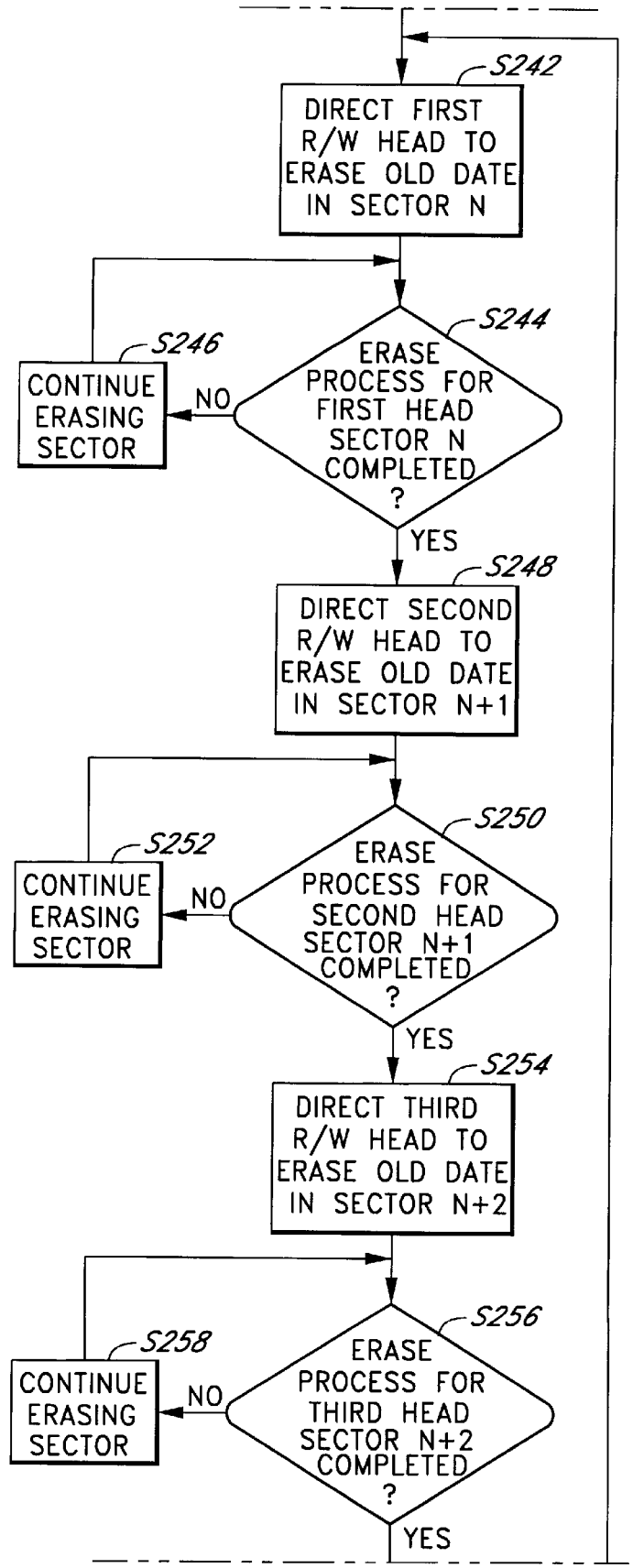
Figure 8D:
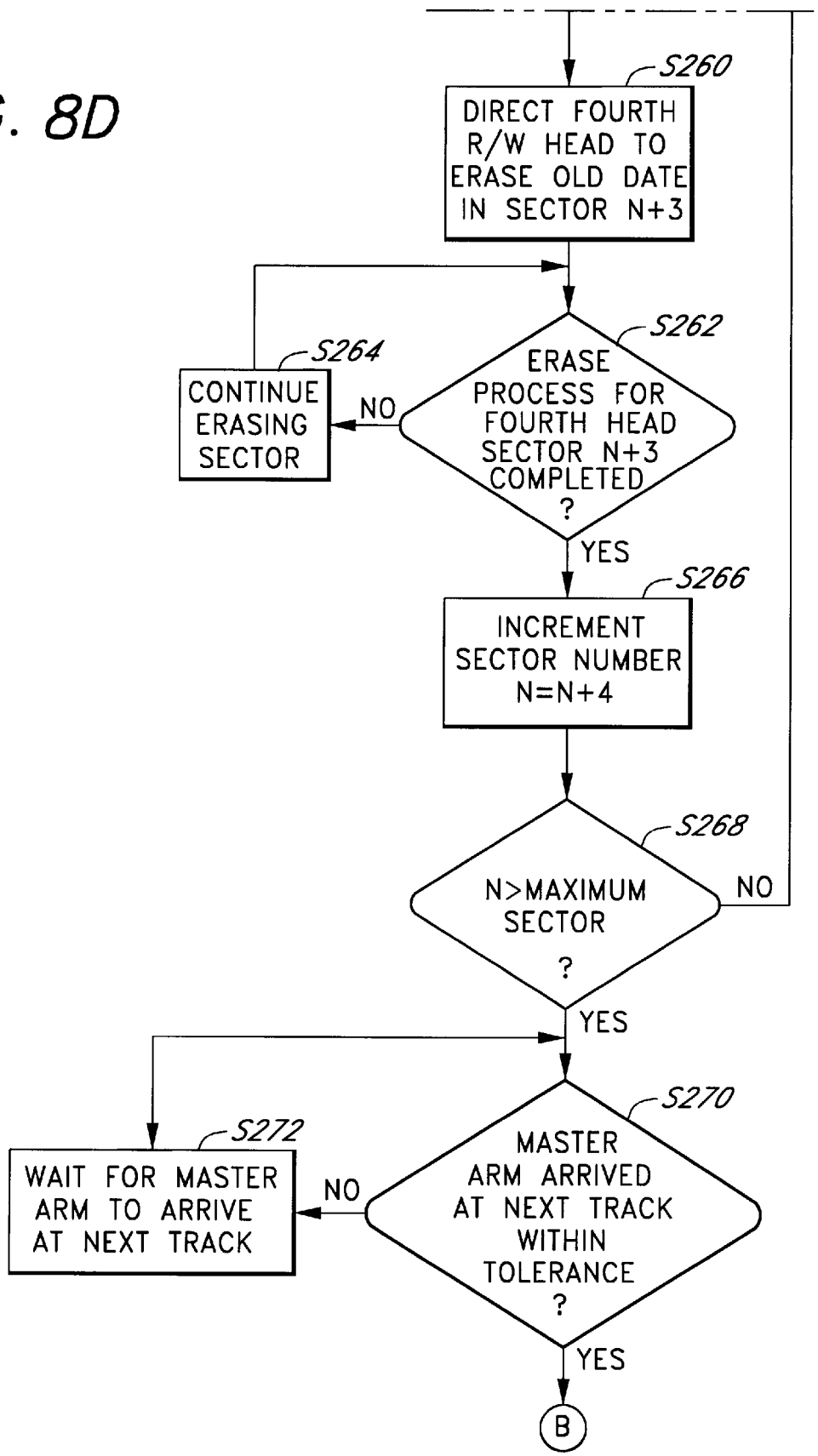

FIG. 8, which includes FIGS. 8A, 8B, 8C and 8D, are flowcharts that illustrate an alternate embodiment of the process of rewriting servo information in accordance with the teachings of the present invention. In this embodiment, the stagger write process occurs first and the stagger erase process occurs while the master arm 14 is moving to a next track. Beginning from a start state, the process S200 of the present invention proceeds to process step S202 where it directs the master arm 14 (FIG. 3A) to position the disk drive arm 20 to the extreme outer track of the disks 102 in the disk pack 100. The process S200 then advances to process step S204, where it determines if it has reached the last track on the disks 102 in the disk pack 100. If so, the process S200 terminates. If not, the process S200 proceeds to process step S206, where it sets a counter for the beginning sector to N=0.

The process S200 then process to process step S208, where the first R/W head 110a is directed to write the new servo pattern in the first sector of head H0. The process S200 then proceeds to decision step S210, where it determines if the write process for the first sector has been completed. If not, the process S200 proceeds to process step S212, where it continues with the write process. If the write process has been completed, the process S200 proceeds to process step S214, where it directs the second R/W head 110b to write the new servo pattern in the first sector of head H1. The process S200 then proceeds to decision step S216, where it determines if the write process for the first sector of head H1 has been completed. If not, the process S200 proceeds to process step S218, where it continues with the writing process. If the write process has been completed, the process S200 proceeds to process step S220, where it directs the third R/W head 110c to write the new servo pattern in the first sector of head H2. The process S200 then proceeds to decision step S224, where it determines if the write process has been completed. If not, the process S200 proceeds to process step S226, where it continues with the write process. If the write process has been completed, the process S200 proceeds to process step S228, where the fourth R/W head 110d is directed to write the new servo pattern on sector 1, head H3. The process S200 then proceeds to decision step S230, where it determines if the write process for the fourth R/W head 110d has been completed. If not, the process S200 proceeds to process step S232. If the write process has been completed, the process S200 proceeds to process step S234.

At process step S234, the process S200 increments the sector count number by one, so that N=N+1. The process S200 then advances to decision step S236, where it queries if N is greater than the maximum number of sectors on the track. If not, the process S200 returns to process step S206. If N is indeed greater than the maximum number of sectors on the track, the process S200 proceeds to process step S238, where the master arm 14 is directed to move to the next track. The process S200 then proceeds to process step S240, where it sets a counter for the beginning sector to N=0.

The process S200 then advances to process step S242, where the first R/W head 110a is directed to erase the old data in the current sector (sector N) on head H0. The process S200 then proceeds to decision step S244, where it determines if the erase process for the current sector has been completed. If not, the process S200 proceeds to process step S246, where it continues with the erase process. If the erase process has been completed, the process S200 proceeds to process step S248, where it directs the second R/W head 110b to erase the old data from sector N+1 of head H1. The process S200 then proceeds to decision step S250, where it determines if the erase process for the current sector of head H1 has been completed. If not, the process S200 proceeds to process step S252, where it continues with the erase process. If the erase process has been completed, the process S200 proceeds to process step S254, where it directs the third R/W head 110c to erase old data from sector N+2 of head H2. The process S200 then proceeds to decision step S256, where it determines if the erase process has been completed. If not, the process S200 proceeds to process step S258, where it continues with the erase process. If the erase process has been completed, the process S200 proceeds to process step S260, where the fourth R/W head 110d is directed to erase old data from sector N+3 of head H3. The process S200 then proceeds to decision step S262, where it determines if the erase process for the fourth R/W head 110d has been completed. If not, the process S200 proceeds to process step S264. If the erase process has been completed, the process S200 proceeds to process step S266.

At process step S266, the process S200 increments the sector count number by four, so that N=N+4. The process S200 then proceeds to decision step S268, where it queries if N is greater than the maximum number of sectors on the track. If not, the process S200 returns to process step S242. If N is indeed greater than the maximum number of sectors on the track, the process S200 proceeds to decision step S270, where it determines if the master arm 14 has arrived at the next track within specified tolerances. If not, the process S200 proceeds to process step S272, where it waits for the master arm 14 to arrive at the next track and continues monitoring for this to occur. If the master arm 14 has arrived at the next track within specified tolerances, the process S200 proceeds to decision step S204, which determines if the process S200 has reached the last track on the disk pack 100. If so, the process S200 terminates.

Through the implementation of the technique of the present invention, servo information may be rewritten on the disk heads of a disk pack without first having to erase the entire disk pack. As a result, the manufacturing productivity of hard disk drives may be significantly increased, while decreasing the cost of reworking such disk packs.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A disk for a hard disk drive, comprising:
   a disk having a plurality of tracks, each track including a first set of Q sectors and a second set of no more than Q-1 sectors, each sector in the first set of Q sectors including a portion of a first servo pattern, said portions of the first servo pattern in the first set of Q sectors, in combination, to allow a hard disk drive servo system to acquire servo lock on the first servo pattern, each sector in the second set of no more than Q-1 sectors including a portion of a second servo pattern, said portions of the second servo pattern in the second set of no more than Q-1 sectors to prevent the hard disk drive servo system to acquire servo lock on the second servo pattern, where Q is a positive whole number greater than one and the first servo pattern is different from the second servo pattern.

2. The disk as recited in claim 1, wherein said disk further comprises a second side with a second plurality of tracks, each track on said second side including a first set of Q sectors and a second set of no more than Q-1 sectors, each sector in the first set of Q sectors including a portion of a first servo pattern, said portions of the first servo pattern in the first set of Q sectors, in combination, to allow a hard disk drive servo system to acquire servo lock on the first servo pattern, each sector in the second set of no more than Q-1 sectors including a portion of a second servo pattern, said portions of the second servo pattern in the second set of no more than Q-1 sectors to prevent the hard disk drive servo system to acquire servo lock on the second servo pattern, where Q is a positive whole number greater than one and the first servo pattern is different from the second servo pattern.

3. The disk as recited in claim 1, wherein the first servo pattern is newly written servo information and the second servo pattern is previously written servo information.

4. A hard disk drive, comprising:

a housing;

a spin motor mounted to said housing;

an actuator arm mounted to said spin motor;

a disk attached to said spin motor, said disk having a first side with a plurality of tracks, each track including a first set of Q sectors and a second set of no more than Q-1 sectors, each sector in the first set of Q sectors including a portion of a first servo pattern, said portions of the first servo pattern in the first set of Q sectors, in combination, to allow a hard disk drive servo system to acquire servo lock on the first servo pattern, each sector in the second set of no more than Q-1 sectors including a portion of a second servo pattern, said portions of the second servo pattern in the second set of no more than Q-1 sectors to prevent the hard disk drive servo system to acquire servo lock on the second servo pattern, where Q is a positive whole number greater than one and the first servo pattern is different from the second servo pattern; and a read/write head mounted to said actuator arm for reading said at least one side of said disk.

5. The hard disk drive as recited in claim 4, wherein said disk further comprises a second side with a second plurality of tracks, each track including a first set of Q sectors and a second set of no more than Q-1 sectors, each sector in the first set of Q sectors including a portion of a first servo pattern, said portions of the first servo pattern in the first set of Q sectors, in combination, to allow a hard disk drive servo system to acquire servo lock on the first servo pattern, each sector in the second set of no more than Q-1 sectors including a portion of a second servo pattern, said portions of the second servo pattern in the second set of no more than Q-1 sectors to prevent the hard disk drive servo system to acquire servo lock on the second servo pattern, where Q is a positive whole number greater than one and the first servo pattern is different from the second servo pattern; and wherein said hard disk drive further comprises a second read/write head mounted to said actuator arm for reading said second side of said disk.

6. The hard disk drive as recited in claim 4, wherein the first servo pattern is newly written servo information and the second servo pattern is old servo information.

7. The disk as recited in claim 1, wherein each sectors in the first set of Q sectors is different from the sectors in the second set of no more than Q-1 sectors.

8. The disk as recited in claim 1, wherein Q is equal to six.

9. The hard disk drive as recited in claim 4, wherein each sectors in the first set of Q sectors in different from the sector in the second set of no more than Q-1 sectors.

10. The hard disk drive as recited in claim 4, wherein Q is equal to six.

* * * * *